(12) United States Patent
Bulluck

(10) Patent No.: US 8,809,445 B2
(45) Date of Patent: Aug. 19, 2014

(54) ROOM TEMPERATURE CURED VINYL SILAZANE COMPOSITIONS

(75) Inventor: John W. Bulluck, Spicewood, TX (US)

(73) Assignee: Texas Research International, Inc., Austin, TX (US)

( * ) Notice: Subject to any disclaimer, the term of this patent is extended or adjusted under 35 U.S.C. 154(b) by 100 days.

(21) Appl. No.: 13/530,211

(22) Filed: Jun. 22, 2012

(65) Prior Publication Data

US 2013/0345356 A1 Dec. 26, 2013

(51) Int. Cl.
*C09D 183/16* (2006.01)
*C08L 83/16* (2006.01)
*C09D 183/04* (2006.01)

(52) U.S. Cl.
CPC ............ *C09D 183/16* (2013.01); *C09D 183/04* (2013.01); *C08L 83/16* (2013.01)
USPC ........... 524/547; 524/588; 524/431; 524/493; 427/387

(58) Field of Classification Search
CPC ..... C09D 183/16; C09D 183/04; C08L 83/16
USPC .......... 524/547, 588, 431, 493; 427/412, 387; 428/446, 450, 413
See application file for complete search history.

(56) References Cited

U.S. PATENT DOCUMENTS

| 6,329,487 | B1 | 12/2001 | Abel et al. |
| 6,534,194 | B2 | 3/2003 | Weihs et al. |
| 6,756,126 | B2 | 6/2004 | Oguir et al. |
| 7,919,189 | B2 | 4/2011 | Bulluck et al. |
| 8,394,889 | B2 | 3/2013 | Bulluck et al. |
| 2006/0234579 | A1 | 10/2006 | Adam et al. |
| 2008/0096024 | A1 | 4/2008 | Cavallin |
| 2009/0092776 | A1* | 4/2009 | Betz et al. ................ 428/34.7 |
| 2009/0286086 | A1* | 11/2009 | Dierdorf et al. ............. 428/412 |

FOREIGN PATENT DOCUMENTS

WO WO2006/044455 A1 4/2006

OTHER PUBLICATIONS

International Search Report, PCT/US13/46320; Jan. 15, 2014, 3 pgs.

\* cited by examiner

*Primary Examiner* — Michael M Bernshteyn
(74) *Attorney, Agent, or Firm* — Egan, Peterman & Enders LLP.

(57) ABSTRACT

A polysilazane composition, formulated from a vinyl silazane and an organometallic accelerator, and associated methods thereof.

38 Claims, No Drawings

ROOM TEMPERATURE CURED VINYL SILAZANE COMPOSITIONS

Subject to right of the assignee afforded under a Small Business Innovation Research (SBIR) program and SBIR Project AF081-37 the U.S. government has a paid-up license in this invention and the right in limited circumstances to require the patent owner to license others on reasonable terms as provided for by the terms of contract number FA8650-10-C-5408 which was supported by The United States Air Force Research Laboratory at Wright-Patterson Air Force Base.

FIELD OF THE INVENTION

This invention relates generally to polysilazane composition that cures near room temperature from a vinyl silazane and an organometallic catalyst.

BACKGROUND OF THE INVENTION

This invention pertains to coatings containing polysilazane, including camouflage coatings for aircraft.

In certain types of aircraft, especially certain military aircraft such as a C-17, the leading edge of titanium (or other metal) slats move perpendicular to the wing's front spar; hence, the gap between the slat and the pylon widens on extension. The flaps are externally blown by the engine efflux for extra lift. It is believed that many of the coating problems on the C-17 are due to the hot blasts of the reverse engine thrusts that thermally damage the current polyurethane camouflage coating on the titanium slats. For the C-17 and other platforms a coating composition that cures at room temperature would be useful for OEM and depot repair.

The inventors herein have determined that a need exists for thermally resistant, low gloss, camouflage coating, especially for the leading edge of aircraft slats and in areas proximal to the engine. The inventors have also determined that a need exists for a coating for aluminum heat shields on the C-130 aircraft or other coated aircraft areas subject to engine efflux.

SUMMARY OF THE INVENTION

This invention provides a solution to one or more of the problems and disadvantages discussed above.

The inventor herein has recognized that commercial ethoxy capped polysilazane is available that cures at room temperature. The problem with the traditional moisture curing ethoxy capped polysilazanes is shelf life stability and pressure build-up in the can over time. The commercial vinyl functional polysilazanes offer good shelf stability but require elevated temperature cure temperatures; the lowest temperature peroxide curing system we were able to previously achieve was 90° C. A vinyl polysilazane that cures below 90° C. would be desirable.

The inventor has discovered that an organometallic catalyst in conjunction with certain peroxides permits curing of vinyl polysilazanes at room temperature within a day. Typical moisture cured elevated temperature cured Taber testing non-catalyzed results from the prior art were similar to those obtained for one day using the catalyzed room temperature cured compositions disclosed herein. In some cases, the ambient cured catalyzed system had slightly better Taber results.

There are commercial off the shelf polysilazanes that cure at room temperature but these polysilazanes are very sensitive to any moisture in head space, fillers, or additives. Even with meticulous drying of coating components the reaction of these ambient cure polysilazanes generates copious amounts of ammonia gas; the pressure can actually distend a sealed thick steel one gallon container within weeks. However, the inventor has determined a way method for free radical curing at room temperature of vinyl functional polysilazanes in a reasonable time or temperature. The inventor has found a viable method for curing these vinyl functional polysilazanes at room temperature (20 to 25 degrees Centigrade). In general, there is an A and B component for the coating. The B component contains a peroxide in, for example, t-butyl acetate/butyl propionate solvent and the peroxide at approximately 4% to provide good shelf life. The A component has the remainder of the ingredients including, by way of example, resin, fillers, dispersant, Teflon, pigments, organometallic accelerator, and/or t-butyl acetate/butyl propionate solvent at approximately 35%. The new accelerated coating cures tack free to 50% of completion after a period two hours at 30° C. It cures 70% to completion at a temperature of 30° C. for 180 minutes. The coating cures to 95% of completion at 30° C. after 5.6 hours or at room temperature within 24 hours. These cure projections are based upon differential scanning calorimetry data (DSC), cure exotherm information.

In one broad respect, this invention is a cured composition, comprising: a cured polysilazane formulated using an organometallic catalyst. In one embodiment, the cured composition is formed using an organometallic catalyst especially a copper (II) catalyst. Examples of such copper (II) catalysts include copper (II) alkylcarboxylates.

In another broad respect, this invention is a process for making a camouflage composition, comprising: providing a formulation containing polysilazane resin, at least one pigment, at least one matting agent, and at least one diluent; allowing at least one diluent to evaporate; and curing the resin to form the polysilazane camouflage composition. In one embodiment, the curing is accomplished using moisture from air. In another embodiment, the curing is accomplished under a nitrogen atmosphere.

In another broad respect, this invention is a camouflaged aircraft component, comprising: an aircraft component having a coating thereon, wherein the coating comprises: cured polysilazane, at least one pigment, and at least one matting agent. In one embodiment, the component is a wing slat made of titanium.

In another broad respect, this invention is a process for manufacturing a camouflaged aircraft component, comprising: providing an aircraft component; applying an uncured coating onto the aircraft component wherein the uncured coating comprises polysilazane resin, at least one pigment, at least one matting agent, and at least one diluent; allowing the diluent to evaporate; curing the coating to provide a cured coating that comprises cured polysilazane, at least one pigment, and at least one matting agent. In one embodiment, the component is a wing slat made of titanium.

This invention provides a number of advantages. The coating is formed from a two component vinyl silazane system that does not suffer from the poor shelf life and moisture sensitivity associated with moisture cured, ethoxy capped silazanes. Advantageously, the two component coating system is easily applied, dries quickly, and cures at room temperature. In service, the jet blasts during reverse thrusting may have a postcure effect and result in property enhancement by further conversion of the polysilazane to silicon nitride or carbide ceramic. The coating to be sprayed is HAP free. In thermogravimetric analysis, some coating exhibited low weight losses such as 1.4% at 800 degrees Centigrade, thus demonstrating excellent high-temperature stability.

When thermal cycling at 650 degrees Centigrade was conducted, very little color and gloss changes were noted and the resistance to diluents was excellent.

DESCRIPTION OF ILLUSTRATIVE EMBODIMENTS

The polysilazane resins used in vinyl polysilazane resins. That is, the polysilazane units are capped with vinyl groups. The polysilazane resins of this invention do not contain ethoxy or other carboxylate caps. The vinyl polysilazane resins used in this invention are vinyl substituted silazane oligomers. The vinyl polysilazanes are generally of formula: R—Si(NSi$_2$)$_3$ where R is alkenyl of from 1 to 6 carbons, or —(—SiRR$_2$—NR$_2$—)$_x$(—SiRR—NR$_2$—)$_y$—(SiRR—NR$_3$—)$_z$ where R2 is hydrogen or alkenyl; x, y, and z are each independently from 1 to 10; and R$_3$ is hydrogen or alkenyl. Representative examples of such materials include Kion Corporation's KDT 1800 polysilazane, which include polysilazane oligomers. Molecular weights of these oligomers range from about 700 to about 1,150 g/mol. These materials are low viscosity oligomer resins and the chains contain vinyl functionality. Upon contact with the organometallic catalyst of this invention and in accordance with this invention and a peroxide, the vinyl polysilazane resin crosslinks. Advantageously the curing of the polysilazane can occur at room temperature in accordance with this invention. Thus, curing can be accomplished in air at room temperature, though higher temperatures can be used to accelerate curing. Such polysilazane resins are described in U.S. Pat. Nos. 6,329,487 and 6,534,194, incorporated herein by reference in their entirety. Thus, in general, the silazanes and polysilazanes may be prepared by ammonolysis, the method comprising the following steps: a) introducing at least one halosilane having at least one Si—H bond into liquid anhydrous ammonia, the amount of liquid anhydrous ammonia being at least twice the stoichiometric amount of silicon-halide bonds on the halosilane, the halosilane reacting with the anhydrous liquid ammonia to form a precursor ammonolysis product and an ammonium halide salt or acid thereof, the ammonium halide salt or acid thereof being solubilized and ionized in the anhydrous liquid ammonia thereby providing an acidic environment; and b) maintaining the precursor ammonolysis product in the acidic environment for a sufficient time to reduce the number of Si—H bonds relative to the quantity of Si—H bonds that are incorporated into the novel silazane and/or polysilazane from the halosilane of step (a). The silazanes or polysilazanes prepared are characterized by repeating units of silicon-nitrogen comprising a reduced amount of Si—H bonds relative to the quantity of Si—H bonds that are incorporated into the silazane or polysilazane from Si—H bond containing starting compounds. Combinations of different silazane starting materials may be used. The polysilazane can be capped with vinyl groups using known methods.

The catalysts used in this invention are organometallic catalysts. As used herein, organometallic catalysts can also be referred to as organometallic accelerators. A variety of metals can be used, such as metals from Group VII, 1B, and 2B. Preferred metal components of the organometallic catalyst include copper, cobalt, and zinc, with copper being preferred. Copper (II) has been found to be the preferred metal component. The organic portion of the catalyst may be composed of a variety of organic moieties including but not limited to carboxylates, such carboxylates including but not limited to 2-ethylhexanoate, octoate, neodecanoate, naphthenate, and acetylacetonate.

The matting agents used in the practice of this invention typically can alter the surface of a coating in such a way that the light falling on it is scattered in a defined fashion. The matting agent particles stand out from the coating, invisible to the human eye. The color of the coating is not affected to any great extent. Representative examples of such matting agents include inorganic matting agents such as silica-based ACEMATT matting agents from Degussa and silica-based matting agents available from Ineos Silicas. The matting agents may vary in size and include materials that are micron sized particles. For example, the particles may have an average diameter of from about 0.1 to 1000 microns, and in one embodiment from 0.1 to 100 microns. Combinations of matting agents may be used.

The pigments used in the practice of this invention may be of any color or combination of colors, as well as employed in any pattern or combination of patterns. The pigments used herein are typically inorganic materials. Inorganic pigments can be crystals of metal oxides. This structure is extremely stable, and sets it apart from organic pigments, which are generally composed of carbon, oxygen, and nitrogen. Such pigments include mixed metal oxides that include more than one type of metal atom along with the oxygen to make the pigment. In general, pigments are produced by the high temperature calcination of high grade metal oxides in a kiln according to given time and temperature profiles. The resulting mixed metal oxide can be milled using a variety of high-energy techniques in order to reduce the particle size. The pigments used herein are typically stable at high temperatures. Representative examples of such pigments include black and gray inorganic pigments, such as the camouflage inorganic pigment packages from Shepherd Color. The camouflage pigment CM2581 available from Shepherd Color contains a mixture of chromic oxide (2-8%), copper chromite black spinel (20-30%), titanium dioxide (50-70%), zinc iron chromate black spinel (10-15%). Combinations of pigments may be used. In addition, ceramic particulate fillers, such as boron nitride, boron carbide, silicon nitride, aluminum oxide, and others may be added to modify the color and gloss properties and improve high temperature abrasion resistance. Alternatively, Teflon powder can be added to improve slip and improve wear properties when used at temperatures up to 482° F.

The diluents (solvents) that are used in the practice of this invention include any diluents that do not react with the polysilazane resin or other components of the formulations of this invention, and which facilitate adequate formation of sprayable formulations. Such diluents include aprotic diluents, especially aprotic diluents that are HAP compliant. Representative examples of such diluents include but are not limited to certain chlorinated hydrocarbons, certain fluorinated hydrocarbons, certain fluorochlorohydrocarbons, including but not limited to para-chlorobenzotrifluoride. Additionally, diluents such as butyl and pentyl propionate have been found especially useful as diluents. A wide variety of aromatic and aliphatic ketones and esters can also be useful as diluents. One preferred class of diluents are esters such as ethyl acetate, propyl acetate, butyl acetate, ethyl proprionate, propyl propionate, butyl propionate, and higher esters. Combinations of diluents may be used.

The coating compositions can also include TEFLON particles, especially in conjunction with diluents such as butyl propionate, t-butyl acetate, and mixtures thereof.

The following coating composition was used with a variety organometallic promoters: Component A, T-butyl Acetate-36.95 weight percentage, Butyl Propionate-24.63 weight percentage, Organometallic promoter-0.49 weight percentage, Kion HTT PolyTem1800-37.93 weight percentage; Component B, T-butyl Acetate-80.32 weight percentage, Butyl Propionate-14.86 weight percentage, T-butylperoxy ethane hexyl carbonate-4.82 weight percentage.

Apply by coating, spraying, brushing, and the like. In one embodiment, the formulation is made for spraying. The resulting coating, when cured, may be of a variety of thicknesses, typically in the range from 0.0025 cm to 0.05 cm, though typically less than 0.005 cm.

The amounts of the components of the uncured coating of this invention are typically 10 to 25 percent by weight of polysilazane resin, 35 to 75 percent by weight of pigment and 0.3 to 10% matting agent, and 10 to 50 percent by weight of diluent, with all percentages adding up to 100 percent. In one embodiment, the amounts of the components of the uncured coating of this invention are 10 to 25 percent by weight of polysilazane resin, 55 to 65 percent by weight of pigment and 1 to 5% matting agent, and 10 to 40 percent by weight of diluent, with all percentages adding up to 100 percent. If the composition includes additional materials other than polysilazane resin, pigment and matting agent, and diluent, the composition overall percentages may change though the relative percentages of polysilazane resin, pigment and matting agent, and diluent will remain as indicated above.

In one embodiment the starting materials are delivered as an A component (or A-side) and a B component (or B-side). The B component may contain, for example, a peroxide in a diluent. Cure can be achieved using a variety of peroxides, including dialkyl peroxides, peroxyketals, diperoxyesters, alkyl peroxyesters and peroxycarbonates. Typically 0.1 to 5 wt % of the above peroxides (alone or in combination) are sufficient to initiate cure. A) 5-Bis(tert-Butylperoxy)-2,5-Dimethyl-3-Hexyne; B) Dicumyl Peroxide; C) 1,1-Bis-(tert-Butylperoxy)-3,3,5-Trimethylcyclohexane; D) 2,5-Dimethyl-2,5-di-(2-Ethylhexanoylperoxy)hexane. The A component may contain, for example, the vinyl silazane precursor and organometallic catalyst in a diluent, as well as any optional other ingredients such as filler, dispersant, Teflon, and/or pigment. Alternatively some or all of the additional ingredients can be in the B component. The diluent or combination of diluents in the B component can be the same or different from the diluent or diluents in the A component. A typical B component may contain from 0.1 to 10 percent of the peroxide in the diluent, more typically from 1 to 5 percent, and even more typically from 3 to 5 percent by weight. The A component may contain from up to 50 percent by weight of ingredients in the diluent (e.g., a total of 25% vinyl silazane resin and catalyst), more typically from 10 to 40 percent by weight, and even more typically from 30 to 40 percent by weight.

In one embodiment, the B component contains a peroxide in, for example, t-butyl acetate/butyl propionate solvent and the peroxide at approximately 4% to provide good shelf life. The A component has the remainder of the ingredients including, by way of example, resin, fillers, dispersant, Teflon, pigments, organometallic catalyst (accelerator), and/or t-butyl acetate/butyl propionate solvent at approximately 35%. The vinyl silazane accelerated coating is capable of curing at 20 to 25 degrees Centigrade. The accelerated coating typically cures tack free to 50% of completion after a period two hours at 30° C. It typically cures 70% to completion at a temperature of 30° C. for 180 minutes. The coating typically cures to 95% of completion at 30° C. after 5.6 hours or at room temperature within 24 hours. These cure projections are based upon differential scanning calorimetry data (DSC), cure exotherm information. After application to a metal coupon, the cured coatings of this invention were subjected to a number of standard tests including salt fog testing, adhesion testing, and high temperature abrasion. The cured coatings performed will in these tests.

The type of substrates and surfaces on which the coating of this invention may be used vary widely. For example, the type of surfaces that can be treated with the adhesives of this invention includes glass, ceramics, metals, and plastics. A particularly advantageous use of this coating is as a coating on aircraft components exposed to high temperatures including exterior aircraft surfaces such as a wing slat made of titanium. Similarly, the coating of this invention can be used on aluminum heat shields on the C-130 aircraft, high temperature abrasion resistant coatings, or other coated aircraft areas subject to engine efflux Other materials may be included in the composition of this invention, including but not limited to flow and leveling agents such as available from BYK, hydrophobic fumed silica such as available from Degussa, alumina fibers such as available from Aldrich, silicon carbide fibers such as available from Aldrich, and the like. If used, such materials will be used in amounts of from 0.01 to about 10 percent of the formulations prior to evaporation of the diluent.

The following examples are provided as being illustrative of the invention, and are not to be construed as limiting the scope of the invention or claims hereto. Unless otherwise denoted, all percentages are by weight.

A cure study was conducted to determine the effect of the different organometallic promoters in conjunction with the t-butylperoxy ethane hexyl carbonate and the Kion KDT 1800 polysilazane. Without the organometallic additive the coating composition did not cure. The fully formulated A and B components were combined and used for coating 2024 aluminum and 1024 steel substrates. The following coating composition was used with a variety organometallic promoters: Component A, T-butyl Acetate-36.95 weight percentage, Butyl Propionate-24.63 weight percentage, Organometallic promoter-0.49 weight percentage, Kion HTT PolyTem1800-37.93 weight percentage; Component B, T-butyl Acetate-80.32 weight percentage, Butyl Propionate-14.86 weight percentage, T-butylperoxy ethane hexyl carbonate-4.82 weight percentage.

The organometallic promoters utilized were copper (II) 2-ethylhexanoate, copper acetylacetonate, cobalt octoate, cobaltic acetylacetonate, zinc octoate, zinc naphthenate, and zinc neodecanoate. Coating formulations using each of these organometallic promoters and without any promoter were prepared and coated on steel and aluminum substrates. The quality or absence of a film were noted after 18 and 42 hours at room temperature.

| Formulation | Promoter | Steel 18 hours | Aluminum 18 hours | Steel 42 hours | Aluminum 42 hours |
|---|---|---|---|---|---|
| 129-2 | Copper (II) 2-ethylhexanoate | Hard cure | Hard Cure | Hard Cure | Hard cure |
| 129-3 | Zinc octoate | Soft Cure | Not Cured | Soft Cure | Soft Cure |
| 129-4 | Copper acetylacetonate | Hard Cure | Hard Cure | Hard Cure | Hard Cure |
| 129-5 | Cobaltic acetylacetonate | Not Cured | Not Cured | Very Soft Cure | Not Cured |
| 129-6 | Zinc neodecanoate | Soft Cure | Not Cured | Soft Cure | Not Cured |
| 129-7 | Cobalt Octoate | Not Cured | Not Cured | Soft Cure | Not Cured |
| 129-8 | Zinc naphthenate | Not Cured | Soft Cured | Soft Cured | Not Cured |
| 129-9 | None | Not Cured | Not Cured | Not Cured | Not Cured |

Based upon these results it can be seen that the copper promoters performed much better in the film formation and cure associated with coatings. The zinc promoters seemed to have a mild acceleration of the cure. The cobalt accelerators had the least acceleration of the tested promoters. The formulations without the organometallic promoters did not cure in any cases. These promoters could be used with any commercial vinyl functional polysilazanes to promote cure at room temperature.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed methods and systems may be utilized in various combinations and/or independently. Thus the invention is not limited to only those combinations shown herein, but rather may include other combinations.

Boron Nitride Accelerated Polysilazane Composition

The composition of a boron nitride accelerated polysilazane composition is provided in Table 1. The composition includes a two component mix at a ratio of 100 parts base to 15.96 parts catalyst. The formulation was applied to panels using brush, roller, and spray techniques. The coating applied well with all techniques, drying and wetting appropriately. An additional amount of n-butyl propionate solvent was used and helped flow and wetting. The t-butyl acetate is very volatile and may need to be used in conjunction with a lower volatility tailing solvent. This formulation is plural component containing a vinyl polysilazane, a binary solvent, an accelerator, pigment, boron nitride, boron carbide, titanium dioxide, and processing aids. The new formulations are plural component and can be cured at room or elevated temperature and utilize an organometallic accelerator for the peroxide.

TABLE 1

| Base Component Component | Amount lbs | Percentage % |
|---|---|---|
| Pigment Shepherd | 9.30 | 18.13 |
| Pigment (Yellow) | 1.00 | 1.95 |
| HTT 1800 | 8.76 | 17.08 |
| BYK 180 | 0.27 | 0.53 |
| Boron Carbide | 8.58 | 16.69 |
| Boron Nitride | 5.44 | 10.60 |
| Teflon Powder | 0.00 | 0.00 |
| T-Butyl Acetate | 3.02 | 5.89 |
| N-butyl Propionate | 14.49 | 28.25 |
| Copper Heaxanoate | 0.45 | 0.88 |
| Totals | 51.30 | 100.00 |

| Catalyst Component Component | Amount lbs | Percentage % |
|---|---|---|
| T-butyl Acetate | 5.29 | 64.60 |
| N-butyl propionate | 2.64 | 32.23 |
| Dicumyl Peroxide | 0.26 | 3.17 |
| Total | 8.19 | 100.00 |

Taber weight loss results at high temperature were very good for the composition, Table 2. Two separate cure scenarios were evaluated: (1) one at room temperature for one day and another (2) high temperature version where cure was three hours at room temperature and elevated temperature for 3 hours at 90° C. The coating abrasion testing was performed at 482° F. for 250 and 500 cycles at a load of 1,000 grams. Cross hatch adhesion was performed on the composition. The cross hatch adhesion was good for both the room temperature Test 2 and high temperature Test 1 cured (90° C. for three hours), Table 3. The composition had after 150 and 300 hours UVA exposure, little change in color, cracking, or checking was noted. A rub test using isopropanol and acetone was performed using 50 rubs of the solvent over the coating. The weight change in the coating was measured and any gross surface changes noted, none were apparent. Fluid immersion test as suggested by L-M were performed with good results, Table 3. Low-temperature flexibility was determined by bending an aluminum coated panel on a 0.375 inch cylindrical mandrel at −60±5° F. (−51±3° C.). After thermal cycling no changes were noted in the compositions on BMI composites. For the salt fog testing some salt precipitated on the coated surface and was difficult to remove, no other changes were noted. Mild steel and titanium coupons were coated with the composition and subjected to a temperature of 760° C. for 3 hours. The front of the steel and titanium coupons had no cracks or checking, the back of the steel coupon was blackened.

TABLE 2

Elevated Temperature Taber Testing Cured at Room and Elevated Temperatures
Abrasion Test

|  | Init Mass | 500 Cycles | mg Loss | mg/rev |
|---|---|---|---|---|
| High Temp | 24.5527 | 24.3369 | 215.8 | 0.4316 |
| Room Temp | 22.5003 | 22.3872 | 113.1 | 0.2262 |

TABLE 3

Fluid Immersion, Weight Changes, and Subsequent Tape Testing
High Temperature Immersion Test BN Containing

|  | Start | End |  |
|---|---|---|---|
| At 145 F. 7 days |  |  |  |
| PAO Coolant | 6.3789 | 6.3855 | 4B* |
|  | 5.8978 | 5.8943 |  |
| Lubricant | 6.3383 | 6.35 | 4B |
|  | 5.5074 | 5.5102 |  |
| Lube Oil | 6.2314 | 6.2452 | 4B |
|  | 5.8651 | 5.8691 |  |
| Hydraulic Fluid | 6.8404 | 6.8564 | 4B |
|  | 6.6352 | 6.6329 |  |
| Gear Lube Oil | 6.1518 | 6.1565 | 4B |
|  | 6.4228 | 6.4266 |  |
| DI Water (6 days) | 6.9150 | 6.9471 | 4B |
|  | 6.3998 | 6.4173 |  |
| JP-8 | 6.3823 | 6.3519 | 4B |
|  | 6.1643 | 6.1498 |  |
| At RT 30 days |  |  |  |
| Runway Deicing | 5.9451 | 5.9511 | 4B |
| 5 Cycles 150 F. to RT |  |  |  |
| Aircraft Deicing | 6.3138 | 6.3273 | 5B |

Teflon™ Containing Accelerated Polysilazane Composition

These formulations were plural component and can be cured at room or elevated temperature and utilize an organometallic accelerator for the peroxide. The formulation is shown in Table 4. The formulation contains two components at a mix ratio of 100 parts base to 15.67 parts catalyst by weight. Taber weight loss results at high temperature were very good for the compositions, Table 5. Peroxycarbonate compositions generally offer cure at a lower temperature for vinyl functional polysilazanes. Two separate cure scenarios were evaluated: (1) one at room temperature for one day and another (2) high temperature version where cure was three hours at room temperature and elevated temperature for 3 hours at 90° C.

The coating abrasion testing was performed at 250° C. for 250 and 500 cycles at a load of 1,000 grams. The tape test method is a quick identifier as to whether a coating has adhered to the substrate. The coating had good crosshatch adhesion. No substantial color change was noted after 96 hours UVB exposure. No changes were noted after BMI samples coating with the composition were subjected to four-hour increments over 24 hours to −65° C. for four hours and then they were shuttled to 150° C. for four hours. Good results in the fluid immersion were obtained for, Table 6 In the salt fog testing for 2,000 hours, although some salt had precipitated on the coated surface and was difficult to remove no other changes were noted. If taken to 943° F. there were no obvious changes other a slight darkening of the composition.

TABLE 4

| Base Component Component | Formulation lbs | Percentage % |
|---|---|---|
| Pigment Shepherd | 8.72 | 16.68 |
| Pigment (Yellow) | 0.53 | 1.01 |
| HTT 1800 | 10.26 | 19.63 |
| BYK 180 | 0.32 | 0.61 |
| Boron Carbide | 4.25 | 8.13 |
| Boron Nitride | 3.19 | 6.10 |
| Teflon Powder | 9.57 | 18.31 |
| T-Butyl Acetate | 3.99 | 7.63 |
| N-butyl Propionate | 11.17 | 21.38 |
| Copper Heaxanoate | 0.27 | 0.52 |
| Totals | 52.28 | 100.00 |
| Catalyst Component Component | Formulation lbs | Percentage % |
| T-butyl Acetate | 5.29 | 64.60 |
| N-butyl propionate | 2.64 | 32.23 |
| Dicumyl Peroxide | 0.26 | 3.17 |
| Total | 8.19 | 100.00 |

TABLE 5

Taber Tests
Abrasion Test

| | Init Mass | 500 Cycles | mg Loss | mg/rev |
|---|---|---|---|---|
| High Temp | 23.8027 | 23.5452 | 257.5 | 0.515 |
| Room Temp | 16.9214 | 16.8533 | 68.1 | 0.1362 |

TABLE 6

Fluid Immersion Weight Changes with Subsequent Tape Test
High Temperature Immersion Test

| | Start | End | Tape Test |
|---|---|---|---|
| At 145 F. 7 | | | |
| PAO Coolant | 6.5696 | 6.574 | 4B |
| | 6.5233 | 6.5227 | |
| Lubricant | 7.5587 | 7.5465 | 4B* |
| | 5.5594 | 5.558 | |
| Lube Oil | 6.2380 | 6.2321 | 4B |
| | 5.6134 | 5.6099 | |

TABLE 6-continued

Fluid Immersion Weight Changes with Subsequent Tape Test
High Temperature Immersion Test

| | Start | End | Tape Test |
|---|---|---|---|
| Hydraulic Fluid | 6.1022 | 6.1009 | 4B |
| | 6.6740 | 6.6705 | |
| Gear Lube Oil | 6.0055 | 6.0005 | 4B |
| | 6.5905 | 6.5865 | |
| DI Water (6 days) | 6.1253 | 6.1538 | 4B |
| | 5.8049 | 5.8345 | |
| JP-8 | 6.3213 | 6.3065 | 4B |
| | 5.7750 | 5.7657 | |
| At RT 30 days | | | |
| Runway Deicing 5 Cycles 150 F. to RT | 5.6835 | 5.6954 | 4B |
| Aircraft Deicing | 5.1724 | 5.1823 | 4B |

What is claimed is:

1. A cured vinyl polysilazane composition, formulated from an uncured vinyl polysilazane that is cured by crosslinking that occurs upon contact with an organic peroxide in the presence of an organometallic accelerator.

2. The composition of claim 1, wherein the metallic component of the organometallic accelerator comprises at least one of copper, cobalt, zinc, or a combination thereof.

3. The composition of claim 1, wherein the metallic component of the organometallic accelerator is copper (II).

4. The composition of claim 1, wherein the organic component of the organometallic accelerator comprises at least one of 2-ethylhexanoate, octoate, neodecanoate, naphthenate, acetylacetonate, or a combination thereof.

5. The composition of claim 1, wherein the organometallic accelerator comprises at least one of copper (II) 2-ethylhexanoate, copper (II) octoate, copper (II) neodecanoate, copper (II) naphthenate, copper (II) acetylacetonate, or a combination thereof.

6. A method of forming a cured polysilazane composition, comprising:
providing an A-side component comprising an organic peroxide;
providing a separate B-side component comprising an uncured vinyl polysilazane resin and an organometallic accelerator;
combining the A-side component with the B-side component to initiate crosslinking of the uncured vinyl polysilazane resin to cure the vinyl polysilazane resin to form the cured polysilazane composition.

7. The method of claim 6, wherein the metallic component of the organometallic accelerator comprises at least one of copper, cobalt, zinc, or a combination thereof.

8. The method of claim 6, wherein the metallic component of the organometallic accelerator is copper (II).

9. The method of claim 6, wherein the organic component of the organometallic accelerator comprises at least one of 2-ethylhexanoate, octoate, neodecanoate, naphthenate, acetylacetonate, or a combination thereof.

10. The method of claim 6, wherein the organometallic accelerator comprises at least one of copper (II) 2-ethylhexanoate, copper (II) octoate, copper (II) neodecanoate, copper (II) naphthenate, copper (II) acetylacetonate, or a combination thereof.

11. A method of forming an abrasion resistant cured polysilazane composition, comprising: contacting an uncured vinyl polysilazane with an organic peroxide in the presence of an organometallic catalyst to form the cured vinyl polysilazane composition.

12. The method of claim 11, wherein the metallic component of the organometallic accelerator comprises at least one of copper, cobalt, zinc, or a combination thereof.

13. The method of claim 11, wherein the metallic component of the organometallic accelerator is copper (II).

14. The method of claim 11, wherein the organic component of the organometallic accelerator comprises at least one of 2-ethylhexanoate, octoate, neodecanoate, naphthenate, acetylacetonate, or a combination thereof.

15. The method of claim 11, wherein the organometallic accelerator comprises at least one of copper (II) 2-ethylhexanoate, copper (II) octoate, copper (II) neodecanoate, copper (II) naphthenate, copper (II) acetylacetonate, or a combination thereof.

16. A curable 2-component system, comprising: an A component which comprises an organic peroxide and a B component which comprises an uncured vinyl polysilazane resin and an organometallic accelerator, the organometallic accelerator being present in the B component to form a cured vinyl polysilazane composition when the organic peroxide of the A component contacts the vinyl polysilazane of the B component in the presence of the organometallic accelerator.

17. The system of claim 16, wherein the metallic component of the organometallic accelerator comprises at least one of copper, cobalt, zinc, or a combination thereof.

18. The system of claim 16, wherein the metallic component of the organometallic accelerator is copper (II).

19. The system of claim 16, wherein the organic component of the organometallic accelerator comprises at least one of 2-ethylhexanoate, octoate, neodecanoate, naphthenate, acetylacetonate, or a combination thereof.

20. The system of claim 16, wherein the organometallic accelerator comprises at least one of copper (II) 2-ethylhexanoate, copper (II) octoate, copper (II) neodecanoate, copper (II) naphthenate, copper (II) acetylacetonate, or a combination thereof.

21. The composition of claim 1, where the cured vinyl polysilazane is formed by crosslinking of the uncured vinyl polysilazane that occurs upon contact with the organic peroxide in the presence of the organometallic accelerator at a cure temperature of from about 20 to about 25 degrees Centigrade.

22. The composition of claim 21, where the uncured vinyl polysilazane is formed by crosslinking of the uncured vinyl polysilazane to at least 95% completion within 24 hours at a cure temperature of from about 20 to about 25 degrees Centigrade.

23. The composition of claim 1, where the uncured vinyl polysilazane has the formula R—Si(NSi$_2$)$_3$; and where R is alkenyl of from 1 to 6 carbons.

24. The composition of claim 1, where the uncured vinyl polysilazane has the formula —(—SiRR$_2$—NR$_2$—)$_x$—(—SiRR—NR$_2$—)$_y$—(SiRR—NR$_3$—)$_z$; where R$_2$ is hydrogen or alkenyl; where x, y, and z are each independently from 1 to 10; and where R$_3$ is hydrogen or alkenyl.

25. The composition of claim 1, where the uncured vinyl polysilazane is prepared by an ammonolysis reaction in anhydrous liquid ammonia with a silazane or polysilazane starting compound including at least one Si—H bond, the silazane or polysilazane product characterized by repeating units of silicon-nitrogen in a polymeric compound having a reduced amount of Si—H bonds relative to those in the starting compound, and further comprising a greater number of Si—N bonds and a greater nitrogen content than the starting compound.

26. The composition of claim 1, where the uncured vinyl polysilazane is prepared by the following steps: a) introducing at least one halosilane having at least one Si—H bond into liquid anhydrous ammonia, the amount of liquid anhydrous ammonia being at least twice the stoichiometric amount of silicon-halide bonds on the halosilane, the halosilane reacting with the anhydrous liquid ammonia to form a precursor ammonolysis product and an ammonium halide salt or acid thereof, the ammonium halide salt or acid thereof being solubilized and ionized in the anhydrous liquid ammonia thereby providing an acidic environment; and b) maintaining the precursor ammonolysis product in the acidic environment to reduce the number of Si—H bonds relative to the quantity of Si—H bonds that are incorporated into the vinyl polysilazane from the halosilane of step (a).

27. The method of claim 6, further comprising:
combining the A-side component with the B-side component to form a mixture;
then applying the mixture to a substrate; and
then allowing the uncured vinyl polysilazane resin in the mixture to cure to form the cured polysilazane composition on the substrate.

28. The method of claim 27, where the substrate comprises an aircraft component; and where the method further comprises
combining the A-side component with the B-side component to form a sprayable formulation; and
then applying the sprayable formulation to the aircraft component by spraying.

29. The method of claim 28, where at least one of the A-side component of the B-side component comprises a diluent to facilitate the sprayable formulation when the A-side component and B-side component are combined.

30. The method of claim 6, further comprising maintaining the A-side component on the shelf and B-side component on the shelf prior to combining the A-side component with the B-side component.

31. The method of claim 6, where the uncured vinyl polysilazane has the formula R—Si(NSi$_2$)$_3$ where R is alkenyl of from 1 to 6 carbons.

32. The method of claim 6, where the uncured vinyl polysilazane has the formula —(—SiRR$_2$—NR$_2$—)$_x$—(—SiRR—NR$_2$—)$_y$—(SiRR—NR$_3$—)$_z$ where R2 is hydrogen or alkenyl; x, y, and z are each independently from 1 to 10; and R$_3$ is hydrogen or alkenyl.

33. The method of claim 6, where the uncured vinyl polysilazane is prepared by an ammonolysis reaction in anhydrous liquid ammonia with a silazane or polysilazane starting compound including at least one Si—H bond, the silazane or polysilazane product characterized by repeating units of silicon-nitrogen in a polymeric compound having a reduced amount of Si—H bonds relative to those in the starting compound, and further comprising a greater number of Si—N bonds and a greater nitrogen content than the starting compound.

34. The method of claim 6, where the uncured vinyl polysilazane is prepared by the following steps: a) introducing at least one halosilane having at least one Si—H bond into liquid anhydrous ammonia, the amount of liquid anhydrous ammonia being at least twice the stoichiometric amount of silicon-halide bonds on the halosilane, the halosilane reacting with the anhydrous liquid ammonia to form a precursor ammonolysis product and an ammonium halide salt or acid thereof, the ammonium halide salt or acid thereof being solubilized and ionized in the anhydrous liquid ammonia thereby providing an acidic environment; and b) maintaining the precursor ammonolysis product in the acidic environment to reduce the number of Si—H bonds relative to the quantity of Si—H bonds that are incorporated into the vinyl polysilazane from the halosilane of step (a).

35. The method of claim 11, further comprising contacting the uncured vinyl polysilazane with the organic peroxide in the presence of the organometallic catalyst to form the cured vinyl polysilazane composition at a cure temperature of from about 20 to about 25 degrees Centigrade.

36. The method of claim 35, further comprising contacting the uncured vinyl polysilazane with the organic peroxide in the presence of the organometallic catalyst to form cure the vinyl polysilazane composition to at least 95% completion within 24 hours at a cure temperature of from about 20 to about 25 degrees Centigrade.

37. The method of claim 11, wherein the metallic component of the organometallic accelerator is cobalt.

38. The method of claim 11, wherein the metallic component of the organometallic accelerator is zinc.

\* \* \* \* \*